United States Patent
Krivopaltsev et al.

(10) Patent No.: US 8,032,504 B2
(45) Date of Patent: Oct. 4, 2011

(54) MECHANISM FOR ENABLING NEW TASK TYPES TO BE ADDED TO A SYSTEM FOR MANAGING DISTRIBUTED NODES

(75) Inventors: Eugene Krivopaltsev, San Jose, CA (US); Govindarajan Rangarajan, Sunnyvale, CA (US); Peinan C. Zhang, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 12/557,418

(22) Filed: Sep. 10, 2009

(65) Prior Publication Data
US 2010/0082621 A1    Apr. 1, 2010

Related U.S. Application Data

(63) Continuation of application No. 10/652,693, filed on Aug. 28, 2003, now abandoned.

(51) Int. Cl.
*G06F 17/30* (2006.01)
(52) U.S. Cl. ........ 707/702; 707/781; 707/793; 707/796; 707/802
(58) Field of Classification Search .................. 707/100, 707/102, 104, 10, 791, 793, 796, 802, 1, 707/702, 781
See application file for complete search history.

(56) References Cited

U.S. PATENT DOCUMENTS

| | | | |
|---|---|---|---|
| 6,209,040 B1 * | 3/2001 | Acton et al. .................. | 719/315 |
| 6,338,056 B1 * | 1/2002 | Dessloch et al. .............. | 707/711 |
| 6,976,029 B2 * | 12/2005 | Venkatesh et al. ..... | 707/999.004 |
| 7,076,784 B1 * | 7/2006 | Russell et al. ................ | 719/315 |
| 2003/0208533 A1 * | 11/2003 | Farquharson et al. ........ | 709/203 |

\* cited by examiner

*Primary Examiner* — Tim T Vo
*Assistant Examiner* — Dangelino Gortayo
(74) *Attorney, Agent, or Firm* — Osha • Liang LLP

(57) ABSTRACT

A mechanism is disclosed for enabling new task types to be added to a management server without changing the source code of the management server. To add a new task type, a descriptor file is provided. This descriptor file specifies all of the particulars of the new task type. Any mechanisms referred to in the descriptor file are also provided. At startup time, the management server processes the descriptor file and forms associations between the various aspects of the task type with the mechanisms that are responsible for implementing those various aspects. At runtime, these associations are used to manage the definition and execution of tasks of that task type. By doing so, the management server enables new task types to be added, and enables task instances of the new task types to be defined and executed, without changing the source code of the management server.

18 Claims, 7 Drawing Sheets

TASK TYPE IDENTIFIER
REFERENCE TO PRESENTATION MECHANISM(S)
REFERENCE TO LOGGING DISPLAY MECHANISM
OPERATIONAL IDENTIFIER
    REFENCE TO EXECUTION MECHANISM

•

•

•

OPERATIONAL IDENTIFIER
    REFERENCE TO EXECUTION MECHANISM
ACCESS CONTROL INFORMATION

*Fig. 2*

```
<tasks>
    <type
        ID = "Core_Module"
        Hidden = "False"
    >
        <editor
            presentation = "Console"
            class = "P1"
        />
        <log
            class = "L1"
        />
        <ACL
            operation = "edit"
            allowUser = "ANYUSER"
            allowGroup = "ANYGROUP"
        />
        <ACL
            operation = "delete"
            allowUser = "ANYUSER"
            allowGroup = "ANYGROUP"
        />
        <ACL
            operation = "execute"
            allowUser = "ANYUSER"
            allowGroup = "ANYGROUP"
        />
        <command
            name = "load"
            class = "E1"
        />
        <command
            name = "enable"
            class = "E2"
        />
        <command
            name = "disable"
            class = "E3"
        />
        <comm and
            name = "unload"
            class = "E4"
        />
    </type>
</tasks>
```

Fig. 3

MECHANISM FOR ENABLING NEW TASK TYPES TO BE ADDED TO A SYSTEM FOR MANAGING DISTRIBUTED NODES

CROSS-REFERENCE TO RELATED APPLICATIONS

This application is a continuation application and claims benefit under 35 U.S.C. §120 of U.S. patent application Ser. No. 10/652,693, filed on Aug. 28, 2003, entitled "Mechanism for Enabling New Task Types to be Added to a System for Managing Distributed Nodes," in the name of Eugene Krivopaltsev et al.

BACKGROUND

Many of today's computing systems are implemented as distributed systems, with a plurality of nodes spread across a diverse geographical area, all coupled together via one or more networks. With a distributed system, it is quite desirable to be able to manage a node remotely. That way, a system administrator sitting at a single console can manage the entire system. A variety of remote management systems have been developed for this purpose.

Even with a remote management system, however, the task of managing an entire distributed system can still be quite tedious and daunting. For example, if a distributed system comprises a large number of nodes, and a particular action (e.g. installing a set of software) has to be performed on each node, it may still take the administrator an enormous amount of time to perform the action on every node, even if that action can be carried out remotely.

To ease this burden, a management server has been developed, which allows the performance of tasks on multiple nodes to be automated. With this management server, an administrator creates a job, which includes a task, a set of node selection criteria, and a specified schedule. Using the node selection criteria, the management server determines on which node(s) of the distributed system the task is to be performed. Then, based upon the specified schedule, the management server automatically causes the task to be performed on the selected node(s) at the proper time(s). Such a server greatly eases the burden on a system administrator.

Currently, the management server allows a variety of different types of tasks to be defined and performed. These task types include, for example: (1) a module task type which enables a module on a node to be loaded and unloaded, and enabled and disabled; (2) a module table task type which enables rows on module tables to be created, deleted, and modified; (3) a property task type which allows properties on modules to be modified (e.g. set value, set alarm threshold, set alarm actions, etc.); and (4) a module configuration propagation task type which enables module configuration information to be distributed to multiple modules on multiple nodes. While the currently available task types are quite varied, they are not comprehensive. As new hardware, software, functionalities, etc. are added to the distributed system, new task types may need to be added to enable the management server to manage and control the new components and functionalities.

Currently, the task types are hard-coded into the software of the management server. Thus, to add new task types, the source code of the management server has to be changed, the updated source code has to be compiled, and the management server has to be reinstalled and re-setup.

SUMMARY

In accordance with one embodiment of the present invention, there is provided a mechanism for enabling new task types to be added to a management server without changing the source code of the management server, and without requiring the management server to be reinstalled or re-setup.

In one embodiment, to add a new task type, a descriptor data structure is provided. In one embodiment, this descriptor data structure takes the form of a descriptor file, which specifies all of the particulars of the new task type, including for example, the name of the task type, a reference to the presentation mechanism that should be invoked to enable a user to define an instance of that task type, a reference to the logging display mechanism that should be invoked to view the execution log for a task of that type, the names of the operations that can be performed for that task type, and references to the execution mechanisms that should be invoked to actually carry out those operations. In addition to providing the descriptor file, the mechanisms referred to in the descriptor file (e.g. the presentation mechanism, the logging display mechanism, the execution mechanisms, etc.) are also provided. In one embodiment, the descriptor file takes the form of an extensible markup language (XML) file, and the mechanisms take the form of fully implemented object classes.

At startup time, the management server accesses the descriptor file. The management server then processes the descriptor file and forms associations between the various aspects of the task type with the mechanisms that are responsible for implementing those various aspects. For example, the management server forms an association between the name of the task type and the presentation mechanism. The management server also forms an association between each operation name and the mechanism that is responsible for executing that operation. Once the associations are determined and formed, the management server is ready for regular operation with that task type.

During runtime, the management server may receive a request from a client indicating that the client wishes to enable a user to define an instance of that task type. Using the previously formed associations, the management server determines the presentation mechanism associated with that task type, and provides a response to the client that enables the client to invoke the presentation mechanism. When invoked, this presentation mechanism provides the user interface needed by a user to specify all of the particulars necessary for defining an instance of that task type (e.g. what operations should be executed, the parameters to be used for those operations, etc.). Once defined, the task instance is saved by the management server as a task definition.

When it comes time to execute the task instance, the management server processes the task definition and determines what operation or operations are to be invoked. Using the previously formed associations, the management server determines, for each operation, which execution mechanism to invoke to execute that operation. The management server then causes the proper execution mechanism (with the proper parameters) to be invoked for each operation. In this manner, the management server enables a task instance of the new task type to be defined and executed.

Notice from the above discussion that the new task type is added to the management server without changing the source code of the management server. So long as a new task type descriptor file and the mechanisms referenced in the descriptor file are provided, the management server will be able to incorporate and support the new task type. Thus, any number of new task types may be added without changing the source code of the management server, without recompiling the source code, and without reinstalling the management server. (Note: task types may be removed in a similar way, e.g. by removing a task type descriptor file and removing the mechanisms referenced in the descriptor file). As a result, the functionality and capability of the management server can be freely extended (and contracted if so desired).

BRIEF DESCRIPTION OF THE DRAWINGS

FIG. 2 shows the information included in a task type descriptor file in accordance with one embodiment of the present invention.

FIG. 3 shows a sample task type descriptor file, which takes the form of an XML document.

DETAILED DESCRIPTION OF EMBODIMENT(S)

System Overview

Figure 1:
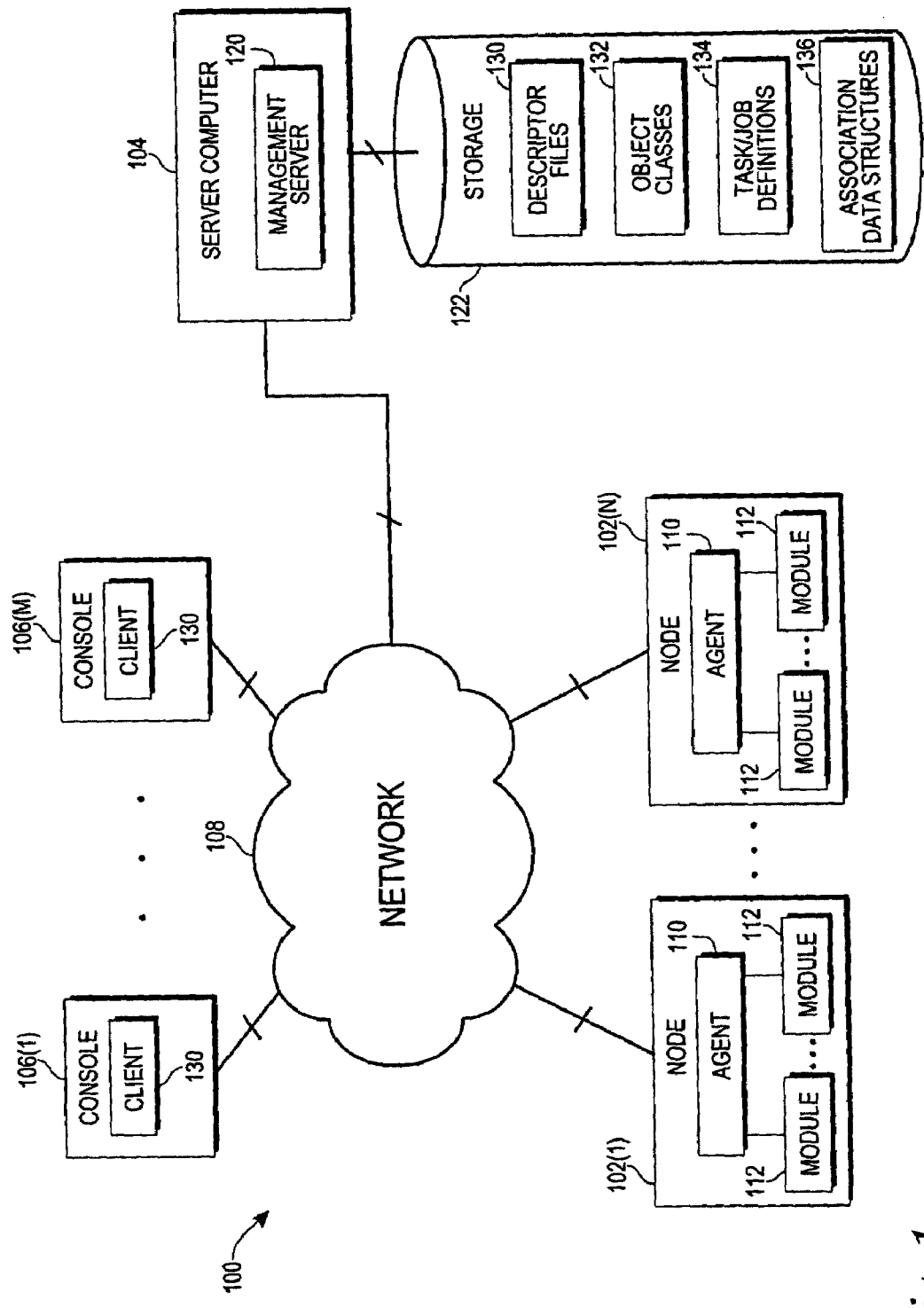
FIG. 1 is a functional block diagram of a distributed computing system in which one embodiment of the present invention may be implemented.

With reference to FIG. 1, there is shown a functional block diagram of a sample distributed computing system 100 in which one embodiment of the present invention may be implemented. As shown, system 100 comprises a plurality of nodes 102, a server computer 104 implementing a management server 120 (hereinafter, MS), and a plurality of consoles 106, all coupled together via a network 108. For the sake of simplicity, only one MS 120 is shown, but it should be noted that system 100 may comprise any desired number of MS's 120 running on one or more server computers 104.

For purposes of the present invention, any type of network may be used as network 108. For example, network 108 may be a local area network (LAN), a wide area network (WAN) such as the Internet, or any other type of network that enables the various components to communicate with each other.

Nodes

The nodes 102 represent the components in the distributed computing system 100 that are to be managed. For purposes of the present invention, a node 102 may be a physical component (e.g. a computer, a peripheral, etc.) or a logical component (e.g. a software process). Anything with functionality to be managed may be a node 102. In one embodiment, to facilitate management, each node 102 implements an agent 110. One or more modules 112 may be "plugged-in" to each agent 110. The agent 110 acts as an intermediary to facilitate communication between the MS 120 and a node 102. More specifically, an agent 110 provides a common interface to enable the MS 120 to communicate with one or more modules 112, and to enable the one or more modules 112 to communicate with the MS 120. By way of this communication, MS 120 is able to control and manage the functionality of the modules 112.

The modules 112 provide the functionalities that are available on a node 102. For purposes of the present invention, each module 112 may provide any one or more desired functionalities. For example, a module 112 may be a database module, which provides database management functions. A module 112 may also be a monitoring module, which monitors resource usage on a node. These and many other types of functionalities may be provided by modules 112. Because the functionalities of the modules 112 can be so varied, the operations that need to be performed to manage the modules 112 can also be quite varied. As new modules 112 with new and different functionalities are added to system 100, different operations may need to be performed to control and manage the functionalities of these new modules 112. This leads to the need to add new task types to the MS 120.

Management Server

MS 120 is the component primarily responsible for managing the various nodes 102 in the distributed system 100. More specifically, MS 120 manages the tasks that are performed to manage the various nodes 102. As used herein, the term "task" refers to a set of one or more operations. These operations may have associated parameters. Together, a set of operations and their associated parameters make up a task definition (other information may be included in the task definition if so desired). Each task definition defines a specific instance of a type of task, Depending on the type of a task, the operations that can be included in a task definition of that type may differ. For example, for a specific instance of a task of type "Core_Module", the available operations may be "load", "unload", "enable", and "disable". For a specific instance of a task of type "Core_DataProperty", the available operations may be "view", "modify", and "delete". Even for instances of the same task type, the operations specified in the task definition may be different. For example, one instance of a "Core_ Module" task type may include a "load" operation and an "enable" operation, while another instance of a "Core_ Module" task type may include a "disable" operation and an "unload" operation. The operations available to both instances are the same, since they are of the same task type, but the specific operations specified in each instance definition may be different. Basically, a task definition enables a user to specify a set of operations to be performed.

In one embodiment, a task definition does not specify on which node or nodes that task is to be performed. Rather, that is specified in a job definition. More specifically, a job definition includes a reference to a task definition, a set of node selection criteria, and a schedule. When it comes time to execute the job, the MS 120 uses the node selection criteria to determine on which nodes 102 to perform the specified task. Then, at the proper time, as specified by the schedule, the MS 120 causes the task to be performed on each of the selected nodes. In this manner, MS 120 enables the performance of tasks on multiple nodes 102 to be automated.

MS 120 is coupled to storage 122. Storage 122 may be a volatile storage (e.g. memory), a persistent storage (e.g. hard drive), or a combination of both. In one embodiment, storage 122 is used by MS 120 to store a variety of information including, but not limited to, descriptor data structures 130, object classes 132, task/job definitions 134, and association data structures 136. These will be discussed in greater detail in a later section.

Consoles/Clients

The consoles 106 represent the components that enable users to interact with MS 120 to, for example, define, modify, and delete tasks and jobs. As shown, each console 106 implements a client 130. The client 130 provides the general user interface for enabling a user to interact with the MS 120. For example, client 130 enables a user to ask the MS 120 for a list of available tasks and task types. Client 130 also allows a user to ask the MS 120 to save, delete, or view a task or job definition. In one embodiment, client 130 does not provide the specific user interface for enabling a user to define a task instance of a particular task type. As will be discussed further in a later section, that is the responsibility of the presentation mechanism associated with that task type.

In system 100, client 130 is shown as being implemented on a console 106, which is separate from the server computer 104. This implementation is advantageous in that it enables a user at a remote console 106 to interact with the MS 120. However, it should be noted that, if so desired, client 130 may also/instead be implemented on server computer 104. That way, a user may use the server computer 104 to interact with the MS 120. This and other implementations are within the scope of the present invention.

Incorporation and Support of Task Types

In one embodiment, the types of tasks that can be performed by MS 120 are not hard-coded into the logic of the MS 120. Rather, they are determined and incorporated by MS 120 at startup time based upon certain pre-provided information. Thus, new task types may be added and incorporated without changing the source code of MS 120.

Descriptor Data Structure

In one embodiment, to make a task type available to MS 120, a provider provides a descriptor data structure that describes the task type. As used herein, the term provider refers to any party that wishes to make a task type available in system 100. The descriptor data structure contains metadata that specifies all of the particulars of the task type. In one embodiment, the descriptor data structure takes the form of a descriptor file; however, for purposes of the present invention, it should be noted that any type of data structure may be used.

In one embodiment, the descriptor file for a task type provides the information shown in FIG. 2. This information includes a task type identifier (e.g. the name of the task type). It also includes a reference to one or more presentation mechanisms (there may be more than one presentation mechanism if multiple user environments are supported, e.g. web environment and desktop environment). The presentation mechanism is the mechanism that is to be invoked to provide the specific user interface needed to enable a user to define a specific instance of that task type. As noted above, different task types may offer different operations. Thus, the presentation mechanism implements specific logic to show the specific operations that the user can select for that type of task, to show the parameters that the user can set for each operation, and to enable the user to select, set, manipulate, etc. these operations and parameters. In one embodiment, the presentation mechanism takes the form of an object class; thus, the reference to the presentation mechanism may be the name and/or the location of the object class.

The descriptor file may also provide a reference to a logging display mechanism, which is to be invoked to view the execution log of a task of that task type. Like the presentation mechanism, the logging display mechanism, in one embodiment, also takes the form of an object class; thus, the reference to the logging display mechanism may be the name and/or the location of the object class.

The descriptor file further provides a list of all of the operations that are available for that task type. For each operation, the descriptor file specifies an operational identifier (e.g. the name of the operation) and a reference to an execution mechanism that is to be invoked to execute that operation. In one embodiment, an execution mechanism takes the form of an object class; thus, the reference to the execution mechanism may be the name and/or the location of the object class. Since a task type may have any number of available operations, the descriptor file may specify any number of operational identifier-execution mechanism pairs.

The descriptor file may further provide some access control information. This information may specify, for example, which users, types of users, groups, or types of groups may perform certain acts (for example, modify or delete a task definition of that task type). The MS 120 uses this information to enforce access restrictions.

The above discussion illustrates some of the types of information that may be provided in a descriptor file. Other information may also be provided if so desired.

In one embodiment, the descriptor file takes the form of an extensible markup language (XML) document. Using XML tags, the different sets of information can be easily delineated, which in turn, enables the file to be easily parsed and the information readily extracted. An example of an XML descriptor file is shown in FIG. 3. In the sample file, general variables (such as P1, L1, E1, E2, E3, and E4) are used, for the sake of simplicity, to represent fully qualified object class names. As can be discerned, this descriptor file is for a task type named "Core_Module", having an associated presentation mechanism "P1" and an associated logging display mechanism "L1". This task type is not hidden, which means that an instance of this task type can be defined using the presentation mechanism (if the hidden property were set to "True", the presentation mechanism would not be usable to define an instance of this task type). This task type also has four available operations: "load", "enable", "disable", and "unload". The execution mechanisms associated with these operations are "E1", "E2", "E3", and "E4", respectively. Furthermore, any user from any group may "edit", "delete", and/or "execute" any task instance of this task type. In this example, the descriptor file contains information for only one task type. It should be noted, though, that if so desired, information describing multiple task types may be provided in a single descriptor file (for example, by using two sets of "type" and "/type" tags, with the information between each set of tags pertaining to one of the two task types). This and other implementations are within the scope of the present invention.

Each task type has an associated descriptor file (as noted above, multiple task types may share the same descriptor file). In one embodiment, all of the descriptor files 130 for all of the task types available to MS 120 are stored in a special directory 130 of storage 122. By doing so, the MS 120 knows at startup time which directory to access to obtain information pertaining to all of the task types that it will support. The MS 120 can then process each descriptor file in the special directory 130 to determine all of the available task types, and the specific aspects of each task type. The process of processing the descriptor files will be elaborated upon in a later section.

Referenced Mechanisms

In addition to providing the descriptor file, the provider of a task type also provides the mechanisms referenced in the descriptor file. This includes, for example, the presentation mechanism(s), the logging display mechanism, and the execution mechanism(s). As noted above, in one embodiment, these mechanisms take the form of object classes; thus, the provider of the task type provides these object classes. To enable the MS 120 to easily locate them, these object classes 132 may be stored in a predetermined portion of the storage 122.

In one embodiment, to enable these object classes to be invoked, the object classes implement some standard interfaces. The interfaces may differ between different types of mechanisms (e.g. the interface for the presentation mechanism may differ from that of the execution mechanism), but all mechanisms of the same type (e.g. all execution mechanisms) implement the same interface. The standard interfaces used, according to one embodiment of the present invention, are set forth below. As used in the present context, the term interface refers to the set of methods that an object class implements.

Presentation Mechanism Interface

In one embodiment, the standard presentation mechanism interface comprises at least three methods: SetOperationalData; GetOperationalData; and ValidateData (the invocation and use of these methods will be elaborated upon in a later section). To enforce this interface, there is provided a presentation mechanism base class, which declares all of these methods. In one embodiment, the presentation mechanism base class is an abstract class, which means that it does not provide any implementations for these declared methods.

To create an actual presentation mechanism object class, a subclass of the presentation mechanism base class is created. Because this object class is a subclass of the presentation mechanism base class, it inherits all of the method declarations of the base class. In addition, an actual implementation is provided in the subclass for each of the methods; thus, if the SetOperationalData, GetOperationalData, or ValidateData method is invoked on the subclass, the subclass will execute logic to give rise to certain functionality. In one embodiment, every presentation mechanism object class is a subclass of the presentation mechanism base class.

It should be noted that different presentation mechanism object classes may provide different implementations for the declared methods. For example, a presentation mechanism object class for a task type "A" may provide certain implementations for the declared methods, while a presentation mechanism object class for a task type "B" may provide different implementations for the declared methods. This is allowed, and in fact, will most often be the case since different task types will need different presentation mechanisms. So long as each presentation mechanism object class provides some implementation for each of the declared methods, the object class will be able to function in system 100.

Logging Display Mechanism Interface

In one embodiment, the standard logging display mechanism interface comprises at least one method: SetData (the invocation and use of this method will be elaborated upon in a later section. Like the presentation mechanism interface, this interface is enforced by providing an abstract base class (a logging display mechanism base class) that declares this method.

To create an actual logging display mechanism object class, a subclass of the logging display mechanism base class is created. In addition, an actual implementation is provided in the subclass for the method, so that if the SetData method is invoked on the subclass, the subclass will execute logic to give rise to certain functionality. In one embodiment, every logging display mechanism object class is a subclass of the logging display mechanism base class. As was the case with presentation mechanism object classes, different logging display mechanism object classes may provide different implementations for the declared method.

Execution Mechanism Interface

In one embodiment, the standard execution mechanism interface comprises at least two methods: Consume; and DoIt (the invocation and use of these methods will be elaborated upon in a later section). Like the presentation mechanism interface, this interface is enforced by providing an abstract base class (an execution mechanism base class) that declares all of these methods.

To create an actual execution mechanism object class, a subclass of the execution mechanism base class is created. In addition, an actual implementation is provided in the subclass for each of the methods, so that if the Consume or DoIt method is invoked on the subclass, the subclass will execute logic to give rise to certain functionality. In one embodiment, every execution mechanism object class is a subclass of the execution mechanism base class. As was the case with presentation mechanism object classes, different execution mechanism object classes may provide different implementations for the declared methods.

Sample Operation

With the above information in mind, a sample operation of the system 100 in accordance with one embodiment of the present invention will now be described. In the following discussion, reference will be made to the system diagram of FIG. 1 and the flow diagrams of FIGS. 4-6.

Startup/Initialization

Figure 4:
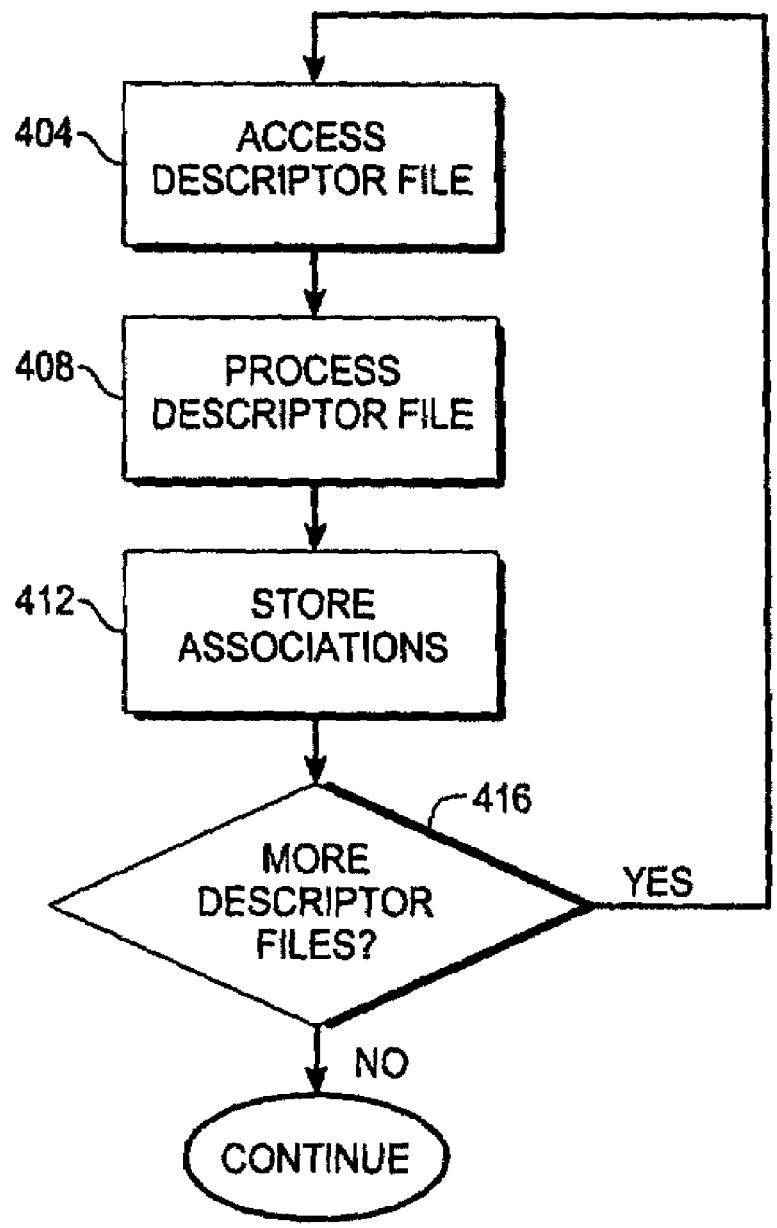
FIG. 4 is an operational flow diagram illustrating the operation of the management server of FIG. 1 during startup, in accordance with one embodiment of the present invention.
Figure 5:
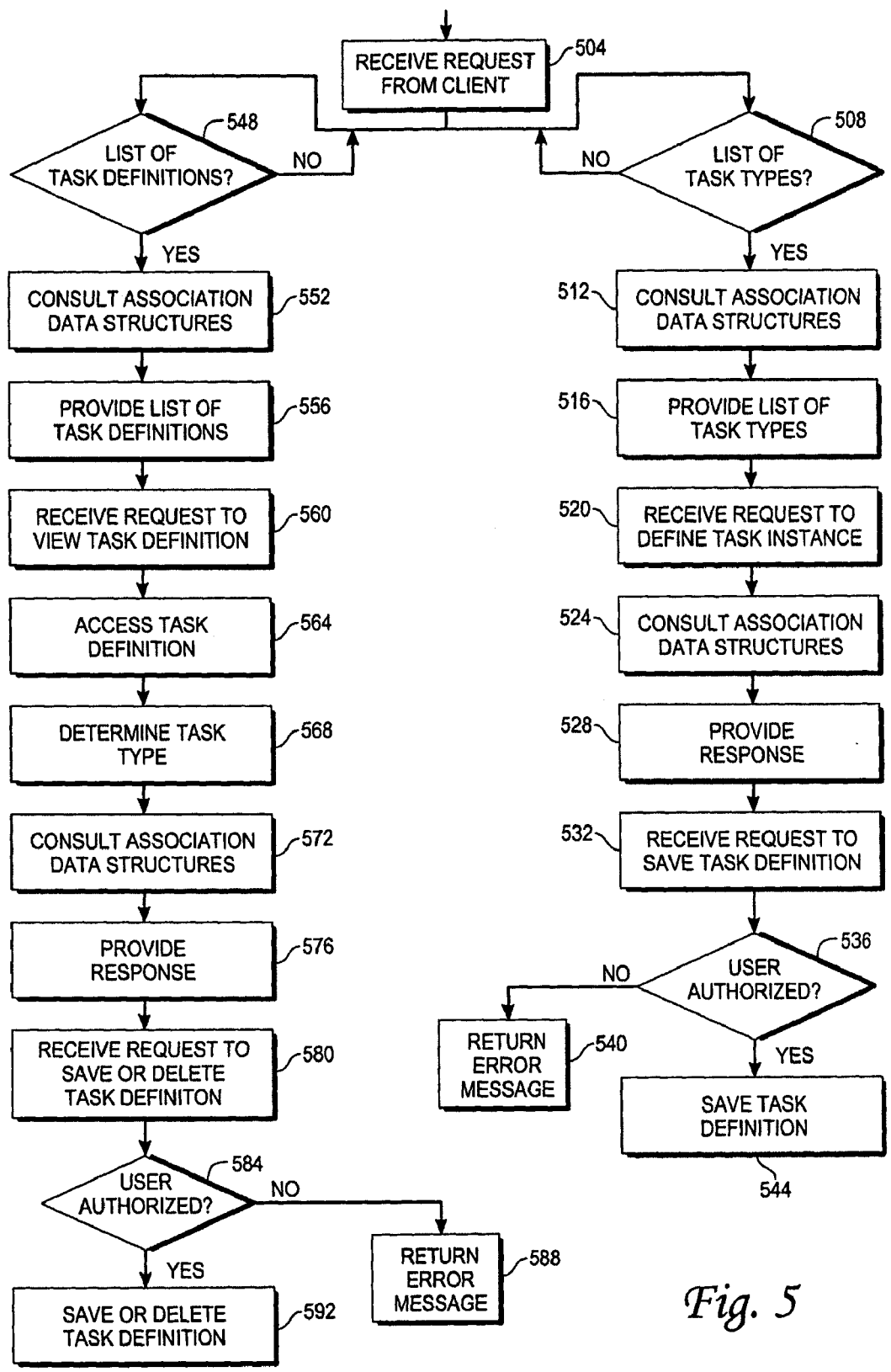
FIG. 5 is an operational flow diagram illustrating the operation of the management server of FIG. 1 during task definition/modification time, in accordance with one embodiment of the present invention.

FIG. 4 depicts the operational flow of MS 120 during server startup/initialization time. Recall that, in one embodiment, all of the descriptor files for task types are stored in a special directory 130 of storage 122. Thus, during startup, MS 120 accesses this special directory. Within this directory, MS 120 accesses (block 404) one of the descriptor files. MS 120 then processes (block 408) the descriptor file to extract task type information therefrom. In one embodiment, all descriptor files take the form of XML files; thus, processing the descriptor file involves parsing the XML file. The result of this process is that MS 120 determines some associations.

Specifically, MS 120 extracts from the descriptor file: (1) a task type identifier (e.g. a task type name); (2) a reference to a presentation mechanism object class for that task type; (3) one or more operational identifiers (e.g. names of operations) for operations available in that task type; and (4) one or more execution mechanism object classes, with each execution mechanism object class associated with one of the operational identifiers. MS 120 may also extract a reference to a logging display mechanism object class for that task type, and a set of access control information. With this information, MS 120 forms some associations. For example, MS 120 forms: (1) an association between the task type identifier and the presentation mechanism object class; (2) an association between the task type identifier and the logging display mechanism object class; (3) an association between the task type identifier and the access control information; and (4) an association between each operational identifier and its associated execution mechanism object class.

After MS 120 determines these associations, it stores (block 412) the associations in storage 122 in one or more association data structures 136. For purposes of the present invention, any type of data structure may be used as association data structures, but in one embodiment, the association data structures take the form of one or more database tables.

After the associations are stored, MS 120 determines (block 416) whether the special directory 130 contains any more descriptor files that need to be processed. If so, MS 120 loops back to block 404 and repeats the above procedure for another descriptor file. If not, then processing of the descriptor files is completed. By the end of the process shown in FIG. 4, MS 120 knows all of the task types that it is to support, all of the presentation mechanisms, logging display mechanisms, and access control information associated with all of those task types, and all of the execution mechanisms associated with all of the operations for all of the task types. Hence, MS 120 is ready for regular operation.

Task and Job Definition

During regular operation, a user interacting with a client 130 may cause the client 130 to send initial requests to MS 120. In one embodiment, these initial requests may be of at least two types: a request for a list of task types available in the system 100; and a request for a list of already-existing task definitions. When MS 120 receives (block 504 of FIG. 5) an initial request from client 130, it determines the type of the initial request, and then reacts accordingly.

Specifically, if MS 120 determines (block 508) that the initial request is a request for a list of the task types available in system 100, MS 120 consults (block 512) the association data structures 136 in storage 122, and extracts therefrom all of the unique task type identifiers. This produces a list of all of the available task types. MS 120 then provides (block 516) this list to the client 130 for display to the user.

At some point, the user selects one of the task types, which indicates that the user wishes to define an instance of that task type. In one embodiment, client 130 responds to this selection by determining whether it already has the presentation mechanism object class associated with this task type. If so, it invokes that object class. If not, it submits a request to MS 120 for the object class. This request specifies the task type that has been selected.

When MS 120 receives (block 520) this request (which, in effect, is a request indicating that the client wishes to enable a user to define an instance of the selected task type), MS 120 consults (block 524) the association data structures 136 in storage 122 to determine the presentation mechanism object class associated with the selected task type. MS 120 then obtains this object class from the object classes portion 132 of storage 122, and provides a response (block 528) to client 130. Included with this response is the presentation mechanism object class. Client 130 thereafter invokes the object class to provide the necessary user interface to enable the user to define an instance of that task type. As an alternative to actually providing the object class, MS 120 may instead include in its response a reference to the object class. The client 130 may use this reference to invoke the object class at its current location. These and other implementations are within the scope of the present invention.

When client 130 invokes the presentation mechanism object class, an object instance is created. This object instance implements logic to provide a user interface that, among other things, specifies to the user what operations are available in this task type, and what parameters may be set for each operation. The object instance also allows the user to select, set, manipulate, etc. these operations and parameters. Using the user interface provided by the object instance, the user defines a task instance of that task type.

At some point, after the task instance is fully defined, the user instructs the client 130 to save the task instance definition. In response, client 130 calls the ValidateData method of the object instance (recall that every presentation mechanism object class implements the SetOperationalData, GetOperationalData, and ValidateData methods). This method causes the object instance to validate that all of the definitional information provided by the user is valid (e.g. if a field requires a date, this method checks to see if the value in that field is a date). If any of the definitional information is invalid, an error message is provided to the user. If all of the definitional information is valid, then client 130 invokes the GetOperationalData method of the object instance. This method causes the object instance to gather up all of the definitional information for the task instance, and to package the information in a format that MS 120 and the execution mechanisms (the execution mechanisms that will eventually execute the operations in this task instance definition) will understand. In one embodiment, this definitional information includes one or more operational identifiers indicating the operations that are included in the task instance, and parameters (if any) associated with each of the operations. The client 130 then submits a request to MS 120 to save the task definition. In one embodiment, this request includes some information pertaining to the user (e.g. user identifier, user group in which the user belongs, etc.), and an indication of the task type.

Upon receiving this request (block 532), MS 120 determines (block 536) whether the user is authorized to define an instance of this task type. To make this determination, MS 120 consults the association data structures 136 in storage 122, and extracts therefrom the access control information associated with the selected task type. Using this information, MS 120 determines whether the user has authorization to define the task instance. If the user does not have authorization, MS 120 returns an error message (block 540) to client 130 for display to the user. On the other hand, if the user is authorized to define the task instance, then MS 120 assigns a unique task identifier to the task definition (in one embodiment, the task identifier comprises information indicating the task type of the task definition), and saves (block 544) it in portion 134 of storage 122. A task instance is thus defined for the selected task type.

In the above description, MS 120 saves the task definition as is; that is, it saves the task definition provided by the client 130. As an alternative, MS 120 may perform some additional processing on the task definition before saving it. Specifically, it was noted above that the task definition comprises one or more operational identifiers. Before saving the task definition, MS 120 can consult the association data structures 136 in storage 122 to determine, for each operational identifier, the execution mechanism object class associated with that operational identifier. The MS 120 can then insert the references to those execution mechanism object classes into the task definition before saving it. That way, the task definition will contain all of the information needed to perform the task, so that there will be no need to consult the association data structures 136 at task execution time. These and other implementations are within the scope of the present invention.

Returning to block 504, if MS 120 determines (block 548) that the initial request is a request for a list of already-existing task definitions rather than a list of available task types, then MS 120 consults (block 552) the task definitions portion 134 of storage 122, and provides (block 556) to the client 130 a list of the task definitions that already exist. In one embodiment, this list includes the unique task identifier for each task definition. The client 130 displays this list to the user.

At some point, the user selects one of the task definitions on the list, which indicates that the user wishes to view and perhaps modify/delete that task definition. The client 130 responds to this selection by determining the task type of the task definition, and determining whether it already has the presentation mechanism object class associated with that task type. If so, client 130 sends a request to MS 120 for the selected task definition only. However, if client 130 does not already have the presentation mechanism object class, then it sends a request to MS 120 for both the selected task definition and the presentation mechanism object class. In the following discussion, it will be assumed that client 130 requests both the selected task definition and the presentation mechanism object class from MS 120.

Upon receiving (block 560) this request, MS 120 accesses (block 564) the task definitions portion 134 of storage 122, and obtains the selected task definition therefrom. In addition, MS 120 determines (block 568) the task type of the task definition, and consults (block 572) the association data structures 136 in storage 122 to determine the presentation mechanism object class associated with that task type. MS 120 then provides a response (block 576) to client 130. In one embodiment, this response comprises the presentation mechanism management object class and at least a portion of the selected task definition. As an alternative, the response may include just a reference to the presentation mechanism object class rather than the object class itself.

When client 130 receives this response, it invokes the presentation mechanism object class to create an object class instance. This object class instance then implements logic to provide the user interface for viewing and editing the selected task definition. After the object class is instantiated, client 130 calls the SetOperationalData method of the object class, and passes in the task definition provided by MS 120. This causes the object class to load in the specific definitional information for the selected task definition, and to show that information to the user. The user is thus able to view the selected task definition. The user may thereafter select, set, manipulate, etc. the operations and parameters to modify the task definition.

At some point, the user will likely instruct the client 130 to either save a modified version of the task definition, or to delete the task definition. If the instruction is a save instruction, the client 130 behaves in a manner similar to that described for saving a new task definition. That is, client 130 calls the ValidateDate method of the presentation mechanism object instance to validate that all of the definitional information provided by the user is valid. Client 130 then calls the GetOperationalData method of the object instance to cause the object instance to gather up all of the definitional information for the modified task instance, and to package the information in a format that MS 120 and the execution mechanisms will understand. Thereafter, client 130 submits a request to MS 120 to save the modified task definition. On the other hand, if the instruction is a delete instruction, then client 130 submits a request to MS 120 to delete the task definition.

Upon receiving either type of request (which, in one embodiment, includes some information pertaining to the user), MS 120 determines (block 584) whether the user has authorization to perform that type of action. To make this determination, MS 120 consults the association data structures 136 in storage 122, and extracts therefrom the access control information associated with the task type of the task definition. Using this information, MS 120 determines whether the user has authorization to delete or to modify (depending on the action requested in the request) a task instance of that task type. If the user does not have authorization, MS 120 returns an error message (block 588) to client 130 for display to the user. On the other hand, if the user is authorized to perform the requested action, then MS 120 complies with the request by either saving the modified task definition or deleting the task definition. If the request is a delete request, MS 120 deletes the task definition from portion 134 of storage 122. If the request is a save request, MS 120 saves the modified definition (using the same unique task identifier) in portion 134 of storage 122. As described previously in connection with saving a definition for a new task instance, MS 120 may do some additional processing to insert, into the task definition, references to execution mechanisms. In the manner described, MS 120 and client 130 interact to enable a user to define, modify, delete, etc., task instances for task types.

After one or more task instances are defined, a user may use client 130 to interact with MS 120 to define one or more jobs. As noted previously, a job comprises a reference to a specific task definition, a set of node selection criteria, and an optional schedule for executing the job (in one embodiment, if no schedule is specified, it means the job should be executed immediately). Using client 130, which provides a job creation/modification interface, the user provides all of the information needed to define a job. MS 120 thereafter saves the job definition in portion 134 of storage 122, and manages the proper execution of that job and other jobs defined and stored in storage 122.

Job and Task Execution

As noted above, job definitions specify the schedules (explicitly or implicitly) for executing the jobs. MS 120 manages these schedules, and at the proper times, executes the jobs. When executing a job, MS 120 uses the node selection criteria specified in the job definition to determine a set of target nodes. MS 120 then causes the task definition referenced in that job definition to be performed on each of the target nodes. In this manner, MS 120 automates the process of performing a task on one or more nodes.

Figure 6:
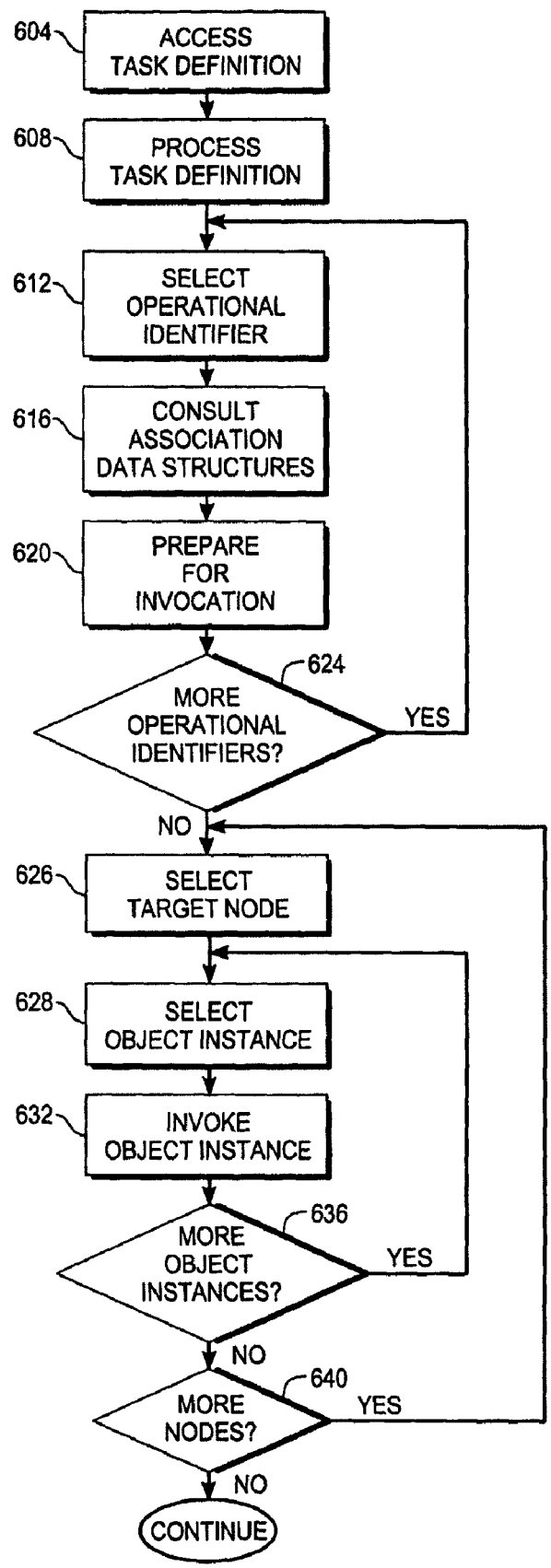
FIG. 6 is an operational flow diagram illustrating the operation of the management server of FIG. 1 during task execution time, in accordance with one embodiment of the present invention.

With reference to FIG. 6, the process of causing a task to be performed on one or more target nodes in accordance with one embodiment of the present invention will now be described. As shown in FIG. 6, MS 120 begins the process by accessing (block 604), from portion 134 of storage 122, the task definition for the task to be performed. MS 120 then processes (block 608) the task definition to extract therefrom a list of operational identifiers and associated parameters (in effect, this is a list of the operations that are to be executed for the task, and the parameters that are to be used for such execution).

MS 120 thereafter selects (block 612) one of the operational identifiers on the list, which may or may not have a set of associated parameters. Using the selected operational identifier, MS 120 consults (block 616) the association data structures 136, and determines the execution mechanism object class that is associated with that operational identifier. When the associated execution mechanism object class is determined, MS 120 prepares (block 620) an instance of that object class for invocation. In one embodiment, the object instance is prepared as follows. Initially, MS 120 accesses the object class from portion 132 of storage 122, and instantiates the object class to give rise to an object instance. Then, MS 120 calls the Consume method (recall that all execution mechanism object classes implement the Consume and DoIt methods) of the object instance, and passes in the parameters (if any) associated with the selected operational identifier. This causes the object instance to consume the parameters, and hence, configure itself with the proper parametric values as defined by the user at task definition time. After that is done, the object instance is ready for invocation.

Thereafter, MS 120 proceeds to determine (block 624) whether there are any more operational identifiers on the list. If so, MS 120 loops back to block 612 to select another operational identifier from the list, and to repeat the above process (blocks 612-620). This continues until all of the operational identifiers on the list have been processed. At the end of this process, there will be a set of object instances, each object instance representing an operation to be executed. Once this set of object instances is derived, MS 120 is ready to cause the task to be performed on a target node.

To do so, MS 120 selects (block 626) a target node. MS 120 then selects (block 628) one of the object instances, and invokes (block 632) that object instance on the target node. In one embodiment, MS 120 does this by calling the DoIt method of the object instance, and passing in an address of the target node. The DoIt method is the method that executes the desired operation, and since it is given the address of the target node, the DoIt method will execute the desired operation on the target node. By this, it is meant that the DoIt method will execute on the server computer 104, but it will cause (by way of communication with the agent 110 on the target node) the appropriate action to be taken on the target node 102. Thus, in a sense, the desired operation is executed on the target node.

After the selected object instance is invoked, MS 120 proceeds to determine (block 636) whether there are any more object instances in the set of object instances. If so, MS 120 loops back to block 628 to select another object instance, and to repeat the above process (blocks 628-632). This continues until all of the object instances in the set of object instances have been invoked on the target node.

Thereafter, MS 120 checks (block 640) to see if there are any more target nodes on which the task is to be performed. If so, MS 120 loops back to block 626 and repeats the above process (blocks 628-636). This continues until the task has been performed on all target nodes. In this manner, MS 120 causes all of the operations of the task to be executed on all of the target nodes.

In the above discussion, it is assumed that the task definition does not contain any references to execution mechanisms. As a result, the MS 120 consults the association data structures 136 in storage 122 to determine the execution mechanism object classes associated with the operational identifiers. As noted previously, however, it is possible to insert the references to the execution mechanisms into the task definition. In such a case, it is not necessary for the MS 120 to consult the association data structures 136. Instead, MS 120 can simply use the references to the associated execution mechanism object classes that are already contained in the task definition. This and other implementations are within the scope of the present invention.

Log Maintenance and Viewing

In one embodiment, MS 120 maintains an execution log for each job. Since a job comprises a task, this means that an execution log is maintained for that task. In one embodiment, as each operation in that task is executed, MS 120 records information pertaining to that operation (e.g. whether it executed successfully or failed, and if it failed, the error messages that were generated). By doing so, MS 120 maintains a chronicle of each operation of the task on each target node.

At some point, a user may wish to view the log for a job to check on the job's status. In one embodiment, to enable the user to do so, the client 130 and MS 120 interact in the following manner. Initially, client 130 sends a request to MS 120 for a list of available job logs. When this list is returned by MS 120, client 130 displays it to the user. The user then may select one of the job logs to review. In response to this selection, client 130 submits a request to MS 120 for the requested job log, and for the logging display mechanism object class that is to be invoked to render the requested job log.

In response to this request, MS 120 accesses the requested job log. Further, MS 120 processes the job log to determine the job that generated the job log, and the task that was specified in that job. MS 120 then determines the task type of that task. Once the task type is known, MS 120 consults the association data structures 136 to determine the logging display mechanism object class associated with that task type.

Thereafter, MS 120 obtains that logging display mechanism object class from portion 132 of storage 122, and sends that object class to client 130, along with the requested job log.

Upon receiving this response from MS 120, client 130 instantiates the logging display mechanism object class to give rise to an object instance. Client 130 then invokes the SetData method of the object instance (recall that all logging display mechanism object classes implement the SetData method), and passes in the requested job log. This causes the object instance to display the log data to the user in an appropriate format. In this manner, a user is able to view the log for a job to determine the status of that job.

Hardware Overview

Figure 7:
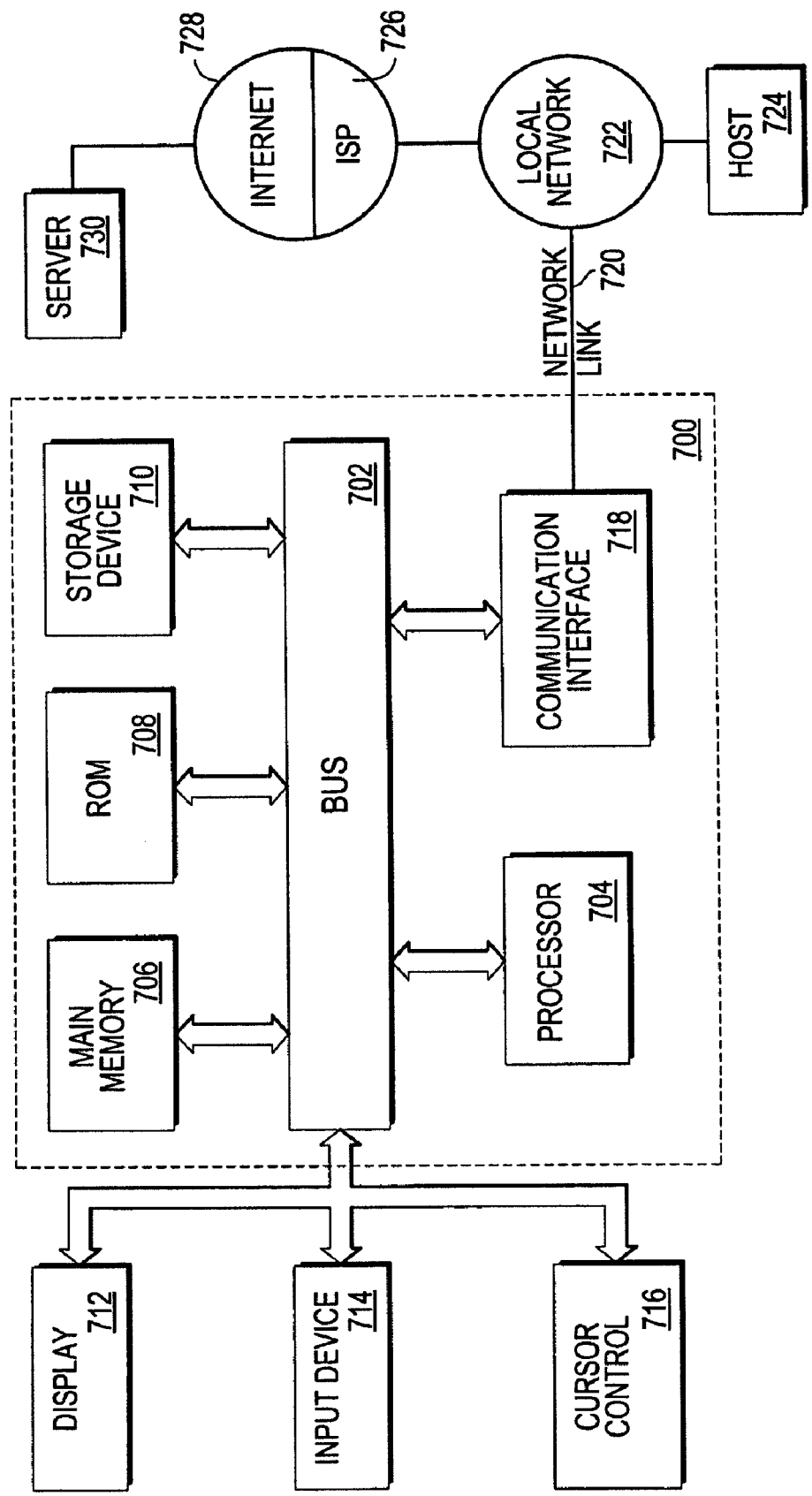
FIG. 7 is a hardware block diagram of a sample computer system, which may be used to execute one or more components of an embodiment of the present invention.

In one embodiment, the various components shown in FIG. 1 (e.g. management server 120, client 130, agent 110, and modules 112) are implemented as sets of instructions executable by one or more processors. These components may be implemented as part of an object oriented programming system, including but not limited to the JAVA™ programming system manufactured by Sun Microsystems, Inc. FIG. 7 shows a hardware block diagram of a computer system 700 which may be used to execute these components. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 may also be further used to store temporary variables or other intermediate information during execution of instructions by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

According to one embodiment, the functionality of the present invention is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A non-transitory computer readable medium comprising software instructions for managing tasks for a distributed computing system, which, when executed on a processor, performs a method, the method comprising:
   receiving, by a management server executing on a server computing system, a task descriptor file comprising:
      a task type identifier associated with one of a plurality of task types, and
      a task type operations list defining at least one operation to be executed on at least one node of the distributed computing system;
   determining, based at least in part on the task descriptor file, that the task type identifier is associated with at least one presentation mechanism;
   determining, based at least in part on the task descriptor file, that the task type identifier is associated with at least one execution mechanism;
   receiving, by the management server, a request from a first client computing system in the distributed computing system to create a first task definition, wherein the request comprises the task type identifier;
   creating, in response to the receiving the request to create the first task definition, a unique task identifier using at least a portion of the request;
   providing, to the first client computing system, the at least one presentation mechanism associated with the task type identifier,
      wherein the first client computing system, in response to the providing, uses the at least one presentation mechanism to obtain definitional information comprising a subset of operations from the task type operations list,
      wherein the subset of operations is arranged by the first client computing system to accomplish a task, and
      wherein the first client computing system generates the first task definition using the definitional information;
   receiving, from the first client computing system, the first task definition by the management server;
   storing, by the management server, the first task definition in a memory storage device operatively connected to the server computing system;
   receiving, by the management server, a job comprising a reference to the first task definition and a node selection criteria;
   retrieving, by the management server, the first task definition from the memory storage device using the reference to the first task definition;
   extracting, from the first task definition, the subset of operations;
   determining, by the management server using the node selection criteria, at least one target node of the distributed computing system; and
   executing each of the subset of operations on the at least one target node.

2. The computer readable medium of claim 1, the method further comprising:
- receiving, by the management server, a request from a second client computing system in the distributed computing system to view the first task definition; and
- providing, to the second client computing system in response to receiving the request to view the first task definition, the at least one presentation mechanism associated with the task type identifier.

3. The computer readable medium of claim 2, the method further comprising:
- receiving, from the first client computing system, a second task definition by the management server; and
- storing, by the management server, the second task definition in the memory storage device.

4. The computer readable medium of claim 3, wherein the second task definition comprises at least a portion of the first task definition.

5. The computer readable medium of claim 2, the method further comprising:
- receiving, by the management server, a request, from the first client computing system to delete the first task definition;
- determining, by the management server, that the request to delete the first task definition is associated with an authorized user; and
- deleting, in response to determining that the request is associated with the authorized user, the first task definition from the memory storage device.

6. The computer readable medium of claim 1,
- wherein the management server determines that the task type identifier is associated with at least one presentation mechanism using a first association data structure within the memory storage device, and
- wherein the management server determines that the task type identifier is associated with at least one execution mechanism using a second association data structure within the memory storage device.

7. The computer readable medium of claim 1, wherein the task definition is associated with an authorized user.

8. The computer readable medium of claim 1, wherein the management server provides a list of task types to the user prior to receiving the request to create a task definition.

9. The computer readable medium of claim 1, wherein the job further comprises a schedule for executing the job.

10. A system for managing tasks for a distributed computing system, comprising:
- a memory storage device, operatively connected to a server, comprising:
  - a plurality of task types, wherein each task type defines at least one operation to be executed on at least one node of the distributed computing system;
  - a plurality of presentation mechanisms;
  - a plurality of execution mechanisms; and
- a management server, executing on the server, comprising functionality to:
  - receive a task descriptor file comprising:
    - a task type identifier associated with one of a plurality of task types, and
    - a task type operations list defining at least one operation to be executed on at least one node of the distributed computing system;
  - determine, based at least in part on the task descriptor file, that the task type identifier is associated with at least one presentation mechanism;
  - determine, based at least in part on the task descriptor file, that the task type identifier is associated with at least one execution mechanism;
  - receive a request from a first client computing system in the distributed computing system to create a first task definition, wherein the request comprises the task type identifier;
  - create, in response to the receiving the request to create the first task definition, a unique task identifier using at least a portion of the request;
  - provide, to the first client computing system, the at least one presentation mechanism associated with the task type identifier,
    - wherein the first client computing system, in response to the providing, uses the at least one presentation mechanism to obtain definitional information comprising a subset of operations from the task type operations list,
    - wherein the subset of operations is arranged by the first client computing system to accomplish a task, and
    - wherein the first client computing system generates the first task definition using the definitional information;
  - receive, from the first client computing system, the first task definition by the management server;
  - store the first task definition in the memory storage device;
  - receive a job comprising a reference to the first task definition and a node selection criteria;
  - retrieve the first task definition from the memory storage device using the reference to the first task definition;
  - extract, from the first task definition, the subset of operations;
  - determine, using the node selection criteria, at least one target node of the distributed computing system; and
  - execute each of the subset of operations on the at least one target node.

11. The system of claim 10, wherein the management server comprises further functionality to:
- receive a request from a second client computing system in the distributed computing system to view the first task definition; and
- provide, to the second client computing system in response to receiving the request to view the first task definition, the at least one presentation mechanism associated with the task type identifier.

12. The system of claim 11, wherein the management server comprises further functionality to:
- receive, from the first client computing system, a second task definition; and
- store, the second task definition in the memory storage device.

13. The system of claim 12, wherein the second task definition comprises at least a portion of the first task definition.

14. The system of claim 11, wherein the management server comprises further functionality to:
- receive a request, from the first client computing system to delete the first task definition;
- determine that the request to delete the first task definition is associated with an authorized user; and
- delete, in response to determining that the request is associated with the authorized user, the first task definition from the memory storage device.

15. The system of claim 10,
- wherein the management server determines that the task type identifier is associated with at least one presentation mechanism using a first association data structure within the memory storage device, and wherein the management server determines that the task type identifier is associated with at least one execution mechanism using a second association data structure within the memory storage device.

16. The system of claim 10, wherein the task definition is associated with an authorized user.

17. The system of claim 10, wherein the management server provides a list of task types to the user prior to receiving the request to create a task definition.

18. The system of claim 10, wherein the job further comprises a schedule for executing the job.

* * * * *